United States Patent
Brown et al.

(10) Patent No.: US 6,217,479 B1
(45) Date of Patent: Apr. 17, 2001

(54) CONVERTERLESS MULTIPLE-RATIO AUTOMATIC TRANSMISSION

(75) Inventors: Larry Thomas Brown, Dearborn; Walter Joseph Ortmann, Ypsilanti; Marvin Paul Kraska, Dearborn, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/353,289

(22) Filed: Jul. 15, 1999

(51) Int. Cl.[7] .................. B60K 41/02; B60K 41/24; B60K 41/28
(52) U.S. Cl. .................. 477/86; 477/70; 477/166; 475/207
(58) Field of Search .................. 477/70, 77, 86, 477/87, 166, 167, 169; 475/207, 208, 214, 215

(56) References Cited

U.S. PATENT DOCUMENTS

| | | |
|---|---|---|
| 3,319,491 | 5/1967 | Simpson . |
| 4,080,848 | 3/1978 | Smirl . |
| 4,433,594 | 2/1984 | Smirl . |
| 4,502,352 | 3/1985 | Svab . |
| 4,602,525 | 7/1986 | Moroto et al. . |
| 4,662,494 | 5/1987 | Wakiya et al. . |
| 4,827,784 | 5/1989 | Muller et al. . |
| 4,938,097 | 7/1990 | Pierce . |
| 5,389,046 | 2/1995 | Timte et al. . |
| 5,421,440 | 6/1995 | Kumagai . |
| 5,609,543 | * 3/1997 | Aoki et al. ............... 477/45 |
| 5,679,099 | 10/1997 | Kato et al. . |
| 5,735,770 | 4/1998 | Omote et al. . |
| 5,836,849 | 11/1998 | Mathiak et al. . |
| 5,876,306 | * 3/1999 | Murata ............... 477/175 |
| 6,042,498 | * 3/2000 | Kashiwase ............... 475/210 |

* cited by examiner

*Primary Examiner*—Sherry Estremsky
*Assistant Examiner*—Tisha D. Waddell
(74) *Attorney, Agent, or Firm*—Frank G. McKenzie

(57) ABSTRACT

A multiple-ratio transmission with planetary gearing and a friction clutch and brake for controlling relative motion of the gearing to establish multiple driving ratios between an internal combustion engine and vehicle traction wheels, the clutch and brake include a forward drive clutch and a reverse drive clutch for establishing torque flow paths through the gearing. The forward drive clutch establishes a torque flow path through the gearing from the engine through a torque output element of the transmission during vehicle startup in forward drive range, and the reverse clutch establishes a corresponding torque flow path during startup in reverse. A mechanical connection between the torque input shaft of the gearing and the crankshaft is characterized by minimal rotating mass, thereby reducing the inertia of rotating mass of the elements of the transmission.

7 Claims, 8 Drawing Sheets

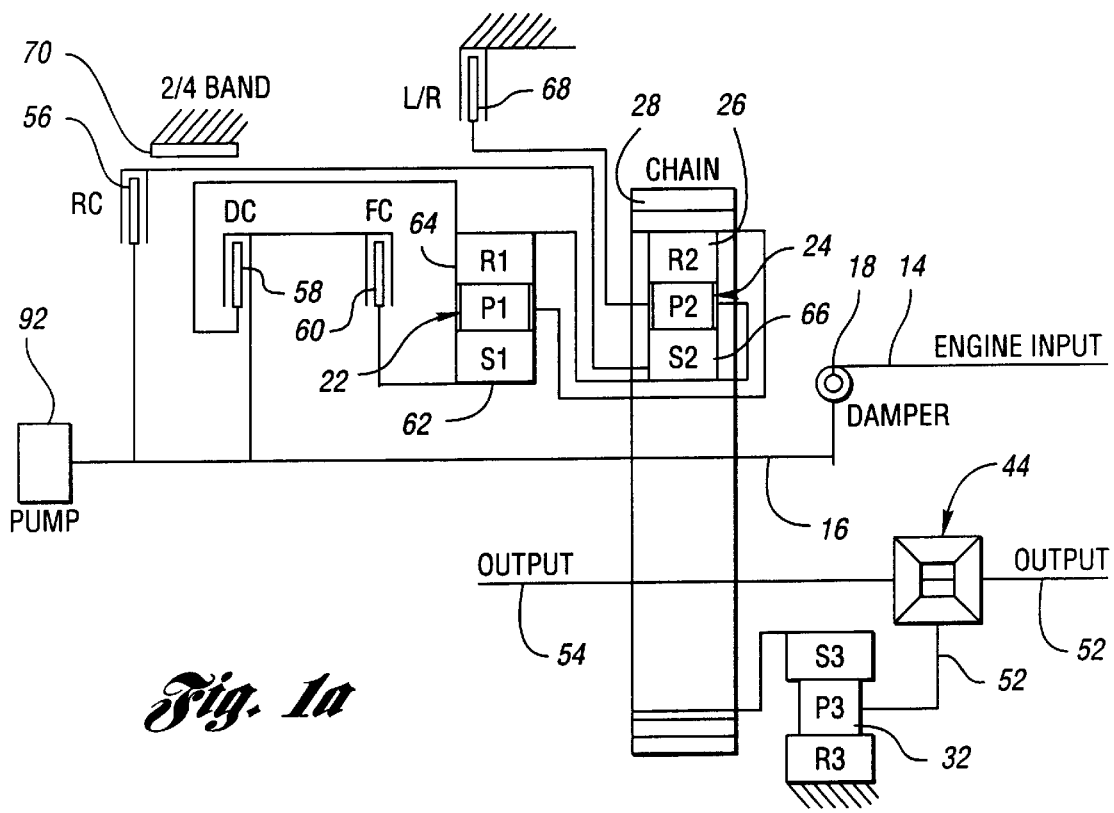
*Fig. 1a*
*Fig. 1b*
| GEAR | RC | FC | DC | L.R | 2.4 | RATIO |
|------|----|----|----|-----|-----|-------|
| 1ST  |    | X  |    | X   |     | 2.889 |
| 2ND  |    | X  |    |     | X   | 1.571 |
| 3RD  |    | X  | X  |     |     | 1.000 |
| 4TH  |    |    | X  |     | X   | 0.698 |
| REV  | X  |    |    | X   |     | 2.310 |
X = ELEMENT TRANSMITS TORQUE
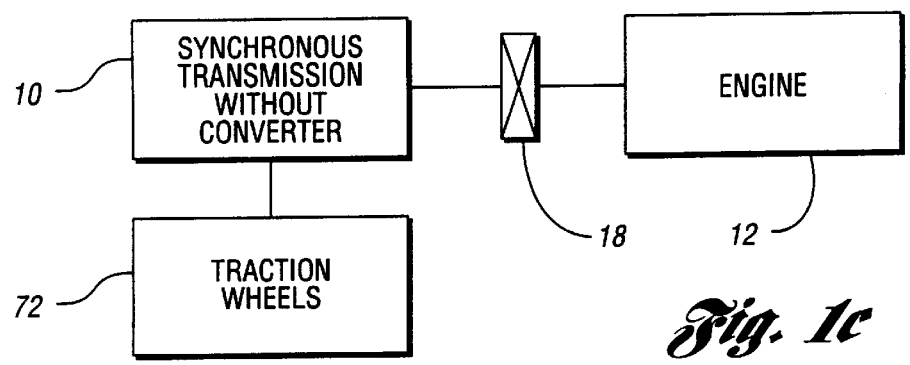
*Fig. 1c*

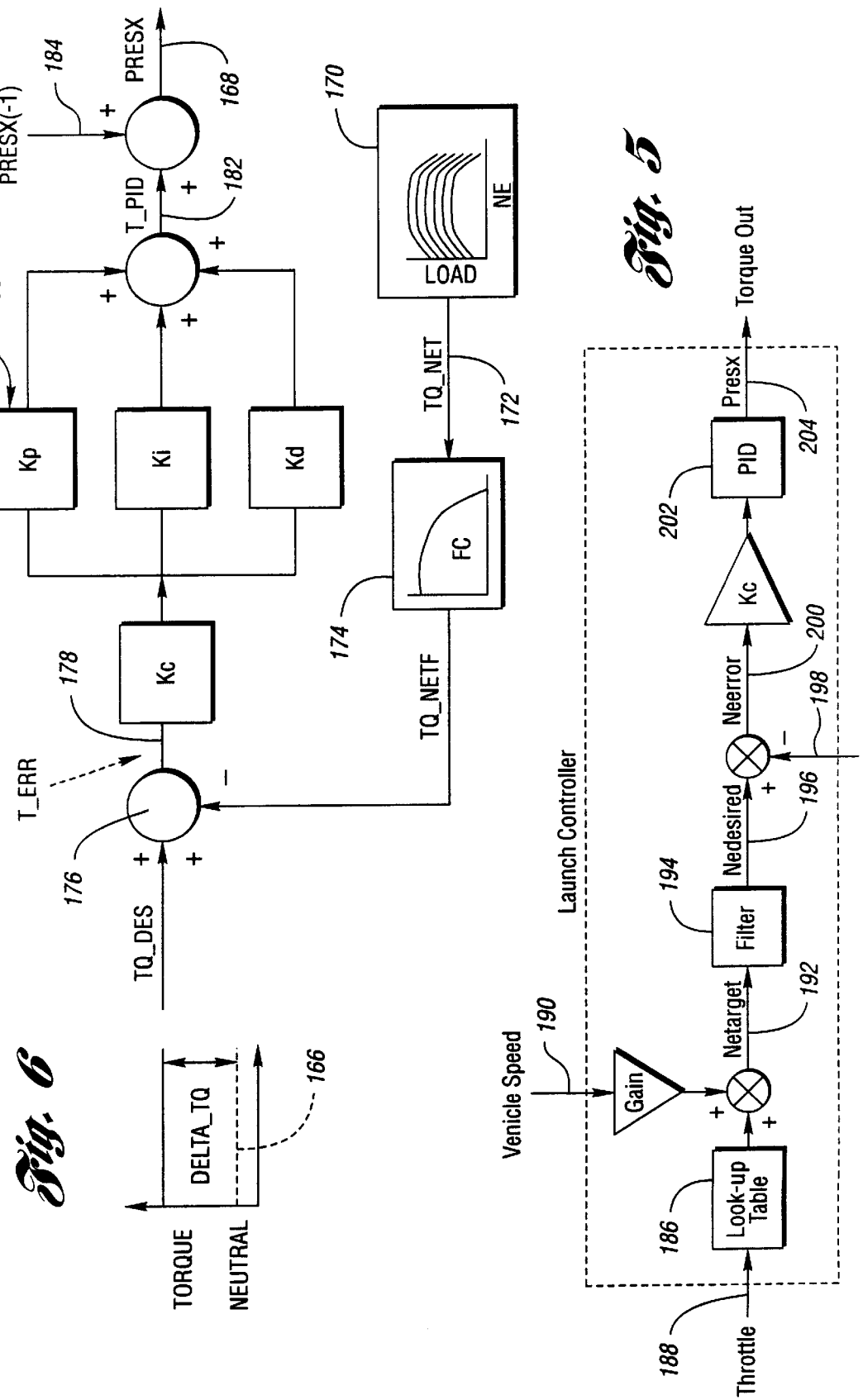

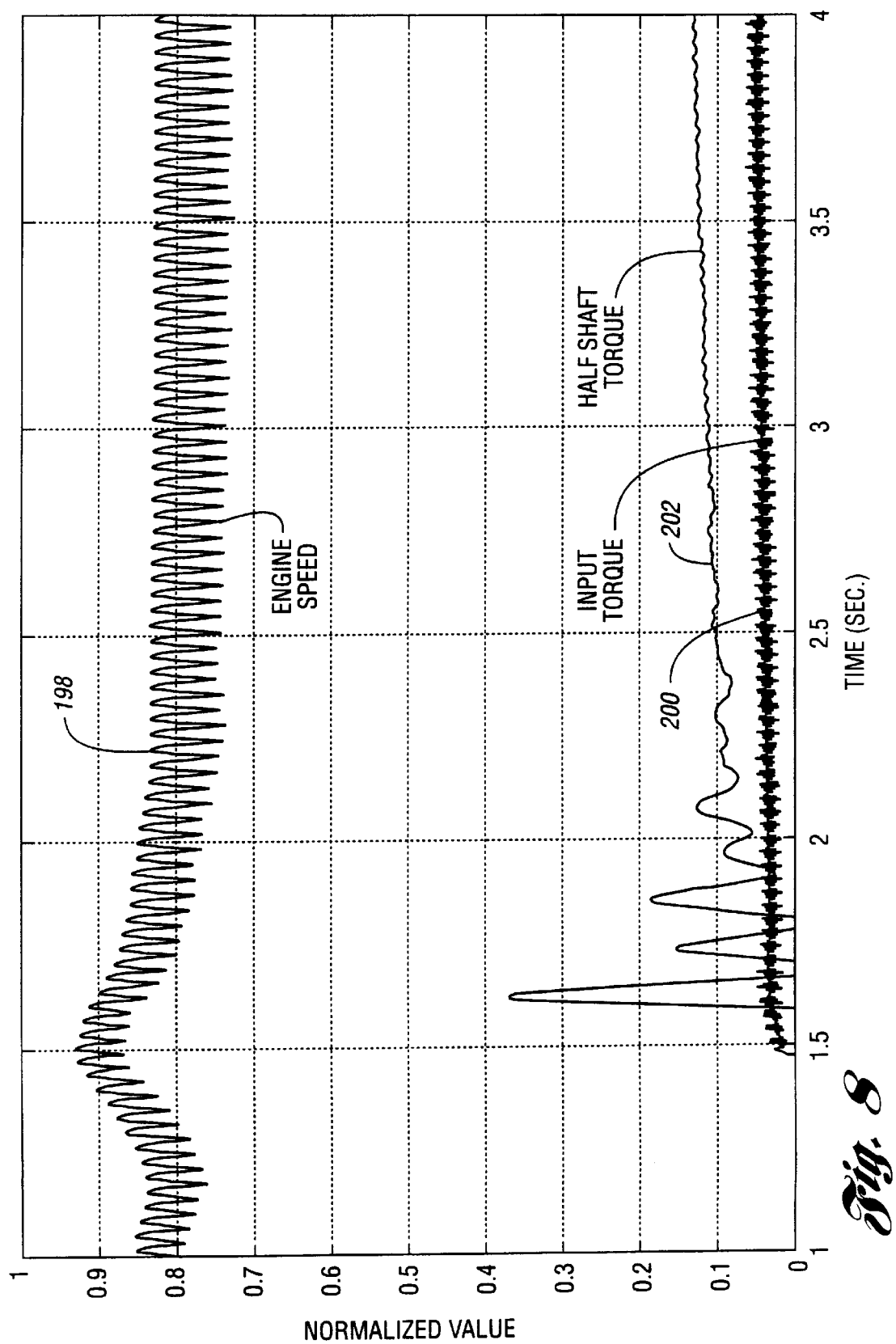

CONVERTERLESS MULTIPLE-RATIO AUTOMATIC TRANSMISSION

TECHNICAL FIELD

The invention relates to automotive vehicle drivelines having an internal combustion engine and multiple-ratio gearing wherein the engine is connected drivably to torque input elements of the gearing without requiring a hydrokinetic torque converter.

REFERENCE TO RELATED APPLICATION

This disclosure has features that are common to the disclosure of copending U.S. patent application Ser. No. 08/353,290, filed Jul. 15, 1999, entitled "Transmission And Control System For Use With An Engine In A Hybrid Electric Vehicle". That application is assigned to the assignee of this invention. The disclosure of that application is incorporated herein by reference.

BACKGROUND OF THE INVENTION

In a multiple-ratio automatic transmission of the kind shown, for example, in U.S. Pat. No. 4,938,097, a multiple-ratio transmission is situated on the torque output side of the hydrokinetic torque converter, the impeller of the converter being connected through the driveline damper to the crankshaft of an internal combustion engine. The turbine of the torque converter is connected to a torque input element of the gearing through a selectively engageable forward-drive friction clutch during operation in forward drive. A separate reverse drive friction clutch connects the turbine of the torque converter to another torque input element of the gearing during operation in reverse.

The torque converter of such known transmissions occupies a substantial space in the driveline assembly between the transmission gearing and the engine. It also is of a relatively large diameter relative to the diameter of the transmission gearing. Further, the converter has a substantial rotating mass, which must be accelerated by the engine during startup of the vehicle in forward drive or in reverse drive.

The effective mass of the converter, of necessity, includes the mass of the hydraulic fluid that circulates in the torus circuit defined by the converter impeller, the turbine and the stator.

The operating efficiency of the converter during startup is low. It varies from a zero value at stall to a maximum value of approximately 80–85% at the coupling point. The coupling point occurs at the transition from the torque multiplication mode to the coupling mode where the torque multiplication ratio is unity. The converter inefficiency results in power loss, which is manifested by an increase in temperature of the hydrokinetic fluid. This necessitates the use of oil coolers, which further add to the gross weight of the transmission assembly and which require additional packaging space for the automotive vehicle driveline.

The torque converter functions, as indicated above, to provide a smooth launch of the vehicle from a standing start. It also disconnects the engine from the driveline when the vehicle is at rest. A third principal function is the dampening of engine torsional vibrations.

Although the torque converter achieves a high torque multiplication ratio of about 2:1 at the outset of a vehicle launch, this torque ratio is accompanied by acceleration of a relatively large mass, which reduces useful torque at the vehicle wheels. The same is true for a transmission of the type disclosed in U.S. Pat. No. 5,836,849, which describes a large diameter startup clutch between an engine and a transmission torque input shaft.

SUMMARY OF THE INVENTION

The invention comprises a driveline with a converterless transmission in which the torque is delivered directly from the crankshaft of an internal combustion engine to the torque input element of multiple-ratio gearing. It is an objective of the invention to provide vehicle launch advantages of a torque converter transmission, as described above, without requiring a torque converter as part of the transmission assembly. In this way, the torque converter inefficiencies in the delivery of torque to the vehicle traction wheels can be avoided.

Since the torque converter is not present in the driveline of the invention, an increased proportion of the engine torque can be delivered directly to the wheels during startup, thereby compensating for any loss of torque multiplication that normally would be provided by a hydrokinetic torque converter. Further, the inefficiencies of a hydrokinetic torque converter that exist following the torque multiplication phase of the torque converter can be avoided, thus providing improved performance throughout a major portion of the operating time.

In accordance with a further objective of the invention, the engine may be disconnected from the driveline by an appropriate neutral-idle type control of the forward or reverse clutches. This is accomplished without the requirement for using a startup clutch intermediate the engine crankshaft and the transmission gearing. The inertia that otherwise would be introduced by the use of a separate startup clutch is avoided, which permits a faster response at the vehicle wheels to a command for startup torque delivered to the engine by the operator through use of an engine throttle.

Torsional isolation, which normally would be provided by a hydrokinetic torque converter, can be obtained with the invention by continuously slipping a friction element of the clutch and brake system for the gearing. During operation in the forward driving gear ratios, the slipping element may be the forward clutch. During operation in direct drive or third ratio, however, either the forward clutch or the direct clutch can be used. In overdrive or fourth ratio, the slipping element may be the direct clutch. During reverse drive operation, the reverse clutch may be used.

The invention further includes a hydraulic valve system using variable force solenoid valves for controlling the forward and reverse drive modes, the direct-drive ratio, the second and fourth drive ratios, and the low-and-reverse drive ratios. In the event that electric power is interrupted for the variable force solenoids, the low-and-reverse variable force solenoid will provide zero pressure. A shuttle valve responds to the loss of low-and-reverse variable force solenoid pressure, thereby making available engine pitot tube pressure, which provides a pressure for engaging the clutches and brakes of the transmission as a function of engine speed squared. In this way, a so-called "limp home" capability is achieved.

Loss of electric power will cause the system to default to third gear during operation of the forward drive ranges and to default to reverse drive when reverse drive range is selected by the operator.

BRIEF DESCRIPTION OF THE DRAWINGS

FIG. 1a is a schematic representation of the gearing elements illustrated in phantom form in FIG. 1;

FIG. 1b is a chart showing the clutch and brake engagement and release pattern to establish each of four forward driving ratios and a single reverse ratio for the gearing of FIG. 1a;

FIG. 1c is a schematic block diagram showing the relationship of an internal combustion engine and a synchronous multiple-ratio transmission without a torque converter for a vehicle driveline;

FIG. 4 is a schematic valve system diagram indicating the principal valve elements that control the clutches and brakes for the transmission assembly illustrated in FIGS. 1 and 1a;

FIG. 5 is a schematic diagram of a closed-loop electronic controller with actual engine speed feedback for the forward clutch or the reverse clutch for the transmission of FIGS. 1 and 1a, which establishes torsional vibration isolation following initial launch;

FIG. 6 is another schematic diagram showing a closed-loop circuit with actual engine torque feedback for controlling clutch engagement in the driveline;

FIG. 7 is a plot of clutch pressure and clutch torque (desired or actual) versus time for a vehicle launch using the converterless transmission of FIGS. 1 and 1a; and FIG. 8 is a plot showing input torque and output torque, as well as engine speed, versus time during a vehicle launch.

PARTICULAR DESCRIPTION OF THE INVENTION

Figure 1:
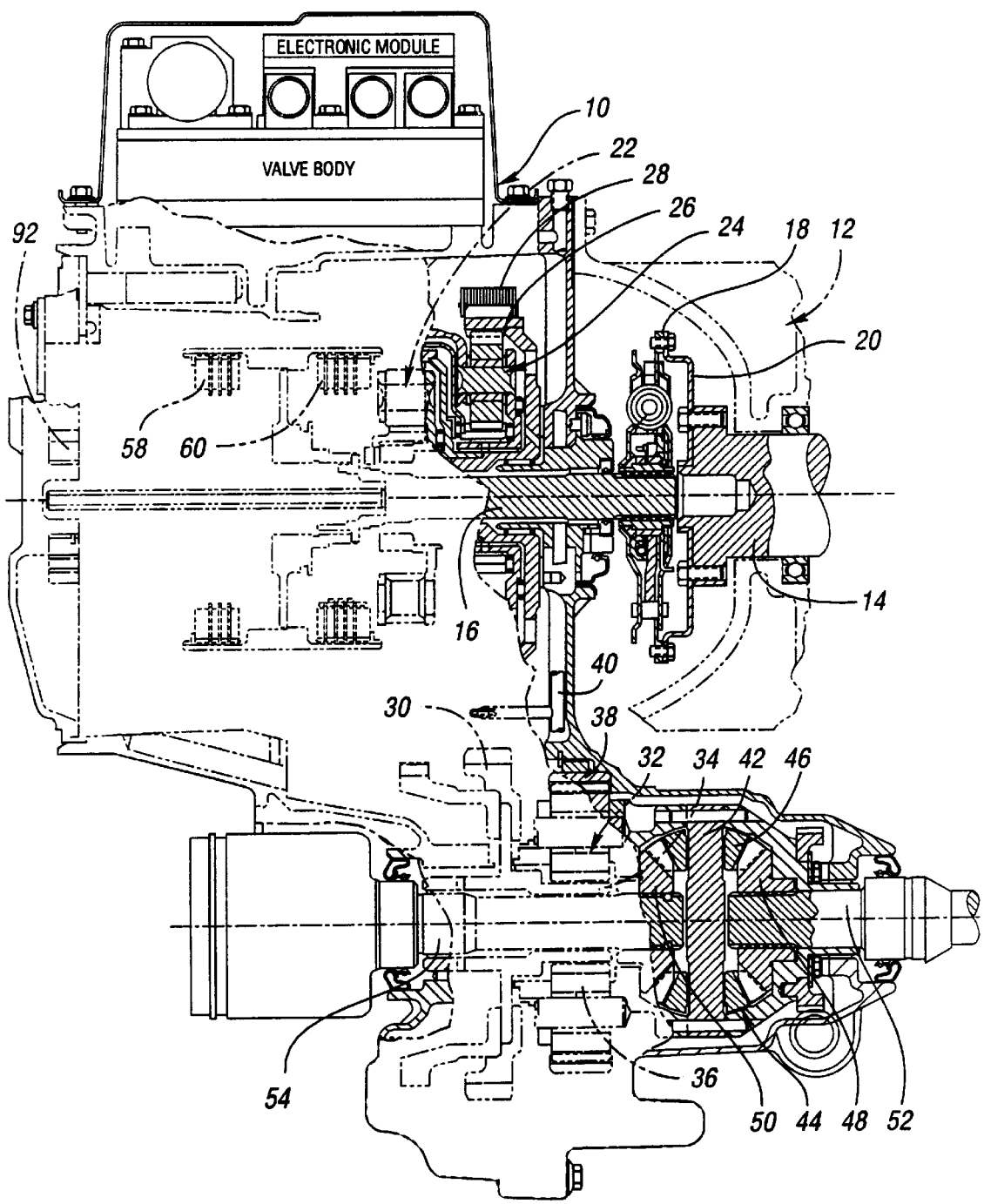
FIG. 1 shows in phantom form a multiple-ratio transmission assembly for a converterless transmission driveline embodying the features of the invention.

FIG. 1 shows in schematic form a multiple-ratio automatic transmission identified by reference numeral 10 and an internal combustion engine 12. The engine 12 includes a crankshaft 14, which is coupled to a torque input shaft 16 for the transmission 10. That coupling is achieved by a damper assembly 18 of conventional construction. The torque input side of the damper 18 may be connected to the crankshaft 14 by a drive plate 20.

The transmission 10 includes a first planetary gearset 22 and a second planetary gear set 24. Ring gear 26 of the gearset 24 defines a drive sprocket for a drive chain 28, which extends to driven sprocket 30 of a final drive planetary gear unit 32.

The torque input gear element of planetary gear unit 32 is ring gear 34, which is engaged by planetary pinions 36. The ring gear 38 of the gear unit 32 is anchored to transmission housing 40.

The carrier for the planetary pinions 36 drives the differential carrier 42 of a differential gear unit 44. Planetary bevel pinions 46 on the carrier 42 engage each of two side gears 48 and 50. Each side gear 48 and 50 is connected drivably to an axle half shaft, as shown at 52 and 54, respectively. Each axle half shaft is connected to a vehicle traction wheel.

The planetary transmission includes a reverse clutch 56, a direct-drive clutch 58, and a forward-drive clutch 60. The function of these clutches will be described generally with reference to the schematic diagram of FIG. 1a.

As seen in FIG. 1a, the engine crankshaft 14 is connected to torque input shaft 16, which transfers torque to sun gear 62 of the planetary gear unit 22 through forward clutch 60, which is engaged during operation in each of the first three forward driving gear ratios. Input shaft 16 is connected through direct clutch 58 to a ring gear 64 during operation in the third forward driving speed ratio.

The torque of the ring gear 64 is transferred through the planetary carrier of gear unit 24. The carrier for gear unit 64 is connected to ring gear 26 of the gear unit 24. Torque input shaft 16 is connected through the reverse clutch 56 to the sun gear 66 of the gear unit 24.

The carrier for the gear unit 24 is selectively anchored by a low-and-reverse disc brake 68 during reverse drive and during low-speed ratio operation.

FIG. 1b shows the clutch and brake engagement and release pattern for the clutches and brakes shown in FIG. 1a. The clutches and brakes are engaged and released selectively to establish each of four forward-driving ratios and a single reverse ratio. The symbols RC, FC, DC, L/R and 2/4, indicated in FIG. 4, designate the clutches and brakes that are similarly designated in FIG. 1a. These clutches and brakes are identified by reference numerals 56, 60, 58, 68 and 70, respectively. Brake 70 anchors sun gear 66 during second ratio operation and fourth ratio operation, the latter being an overdrive ratio.

FIG. 1c is a general block diagram showing the driveline for an automotive vehicle. The engine crankshaft for engine 12 is connected directly to the transmission 10 by the damper 18 and the output half shafts for the transmission drive traction wheels 72.

Figure 2:
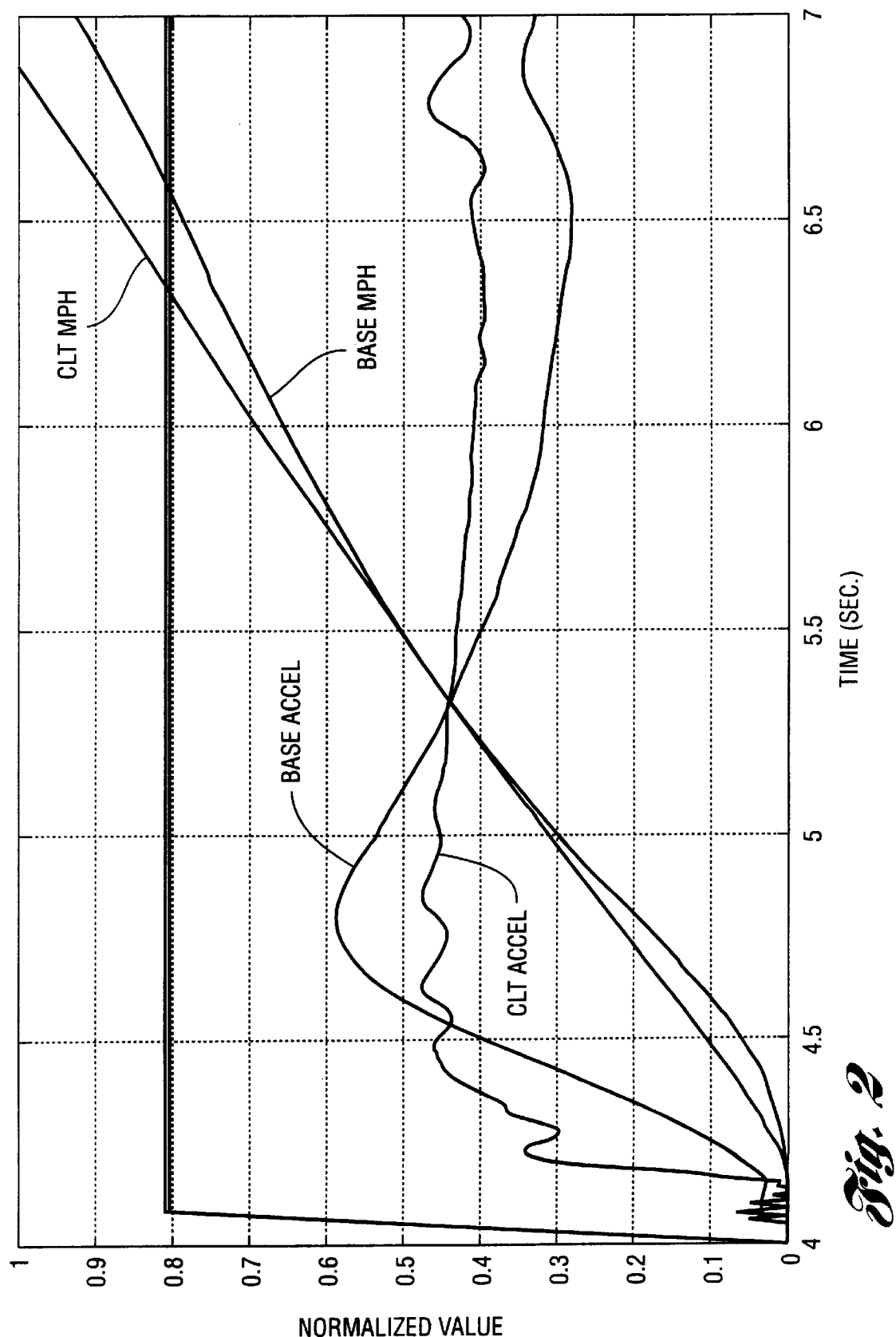
FIG. 2 is a chart showing the relationship between vehicle speed and vehicle acceleration with respect to time following the outset of a vehicle launch.

FIG. 2 demonstrates that the initial acceleration of the vehicle using the converterless transmission of the invention rises quickly immediately following the start of a launch, as indicated at 72. For purposes of comparison of the converterless transmission of the invention, a corresponding acceleration plot for a known transmission for the same vehicle is shown at 74, the known transmission being of the type shown in U.S. Pat. No. 4,938,097.

The plot 74 rises with a lesser slope than the slope of the plot 72. This is due to the relatively large mass that creates an initial inertia during startup. Acceleration of that mass, which consists of the mass of the converter and the mass of the converter fluid, requires engine torque, thereby reducing the net torque that is available at the traction wheels immediately following the opening of the engine throttle by the operator. The reduced rotary mass for the converterless transmission of the invention compensates for the loss of the torque multiplication associated with a torque converter transmission of the kind shown, for example, in U.S. Pat. No. 4,938,097.

Although the acceleration plot 74 will reach a higher peak compared to the peak acceleration of the transmission of the invention because of the torque multiplication of the converter, the peak occurs substantially later following the initial launch.

The vehicle speed for a driveline having a transmission of the kind shown in U.S. Pat. No. 4,938,097 is shown at 76. The corresponding vehicle speed versus time relationship for the converterless transmission of the invention is shown at 78. The plots 76 and 78, as observed in FIG. 2, are not substantially different, one with respect to the other. At a time of about 5.3 seconds, the vehicle speeds are the same for each driveline. At a later time in the launch event, the converterless transmission driveline results in a higher vehicle speed, as shown in the right-hand portion of the plots of FIG. 2. This is due in large measure to the improved operating efficiency of a converterless transmission compared to the corresponding torque converter transmission for which the converter efficiency is only about 80–85% due to hydrokinetic power losses.

Figure 3:
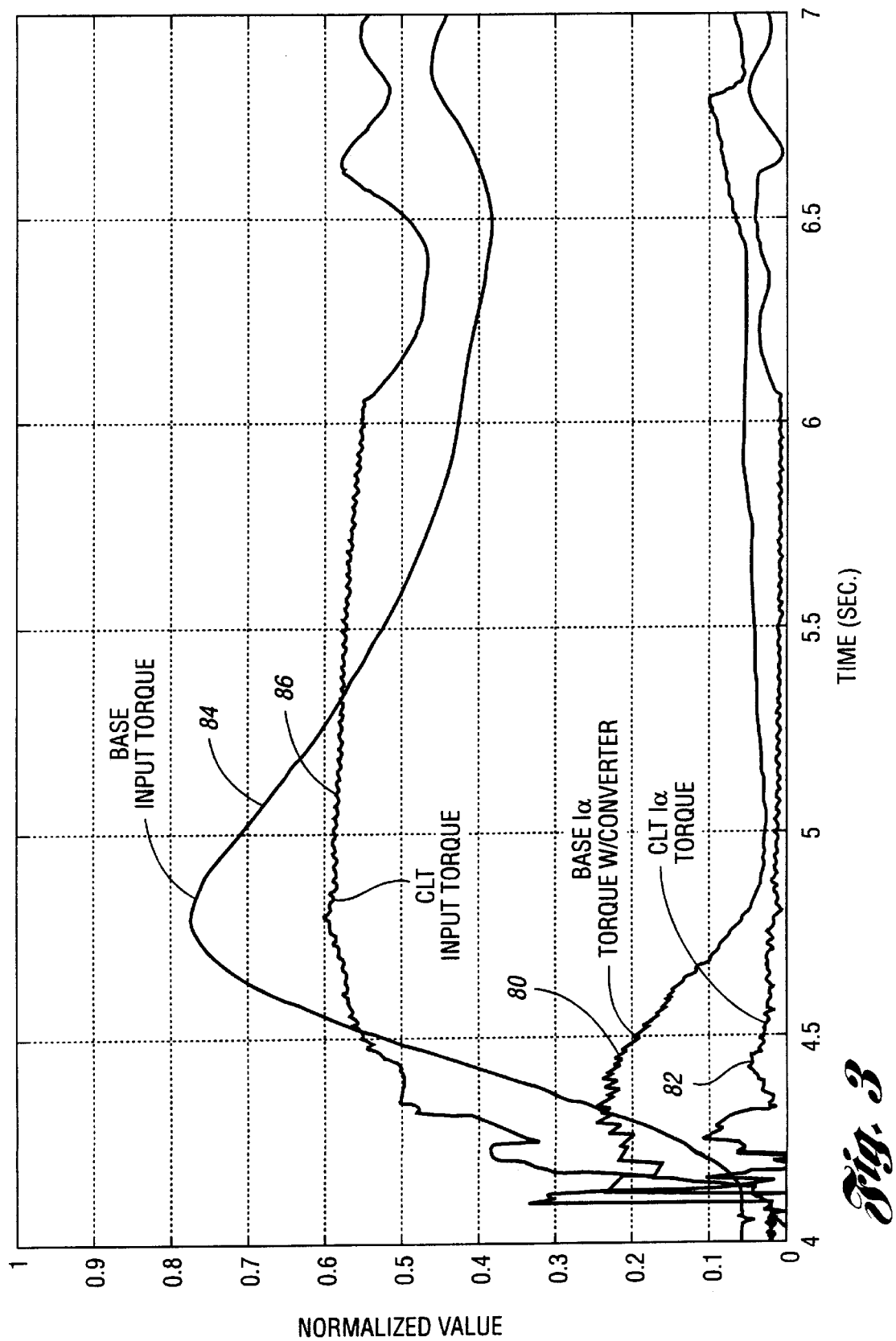
FIG. 3 is a chart showing torque output and torque input with respect to time following the outset of a vehicle launch.

FIG. 3 demonstrates the effect of the significant decrease in the inertia torque for the converterless transmission of the invention compared to a transmission of the kind shown in U.S. Pat. No. 4,938,097. A plot of the inertia torque (Iα) for the base transmission is shown at 80, and the corresponding inertia torque relationship with respect to launch time for the converterless transmission of the invention is shown at 82.

The relationship of torque to launch time for the base transmission is shown at 84, and the corresponding relationship for the converterless transmission is shown at 86. These curves generally agree with the acceleration curves of FIG. 2. That is, the input torque achieved with a converterless transmission of the invention rises sharply following initial launch compared to the delayed torque response for a base transmission, as shown by curve 84.

For a base transmission, the hydrokinetic converter provides a smooth disconnect between the engine and the transmission. To achieve a corresponding disconnect between the engine and the transmission using the converterless transmission of the invention, the disconnect is accomplished by a neutral idle-type control on the forward or reverse clutches 60 and 58, respectively.

Torsional isolation can be accomplished to compensate for the torsional isolation normally provided by the converter in a base transmission. This is done by slipping a friction element by an incremental amount (e.g., 10–20 rpm) during torque delivery. If the transmission is operating in the first or second gear ratio, the slipping element is the forward clutch 60. In third ratio, either the forward clutch 60 or the direct clutch 58 can be controlled to effect the necessary slipping to achieve torsional isolation. During operation in the fourth ratio, the direct clutch 58 is controlled to achieve slipping. During reverse drive, the reverse clutch 56 is controlled to achieve slipping.

Figure 4:
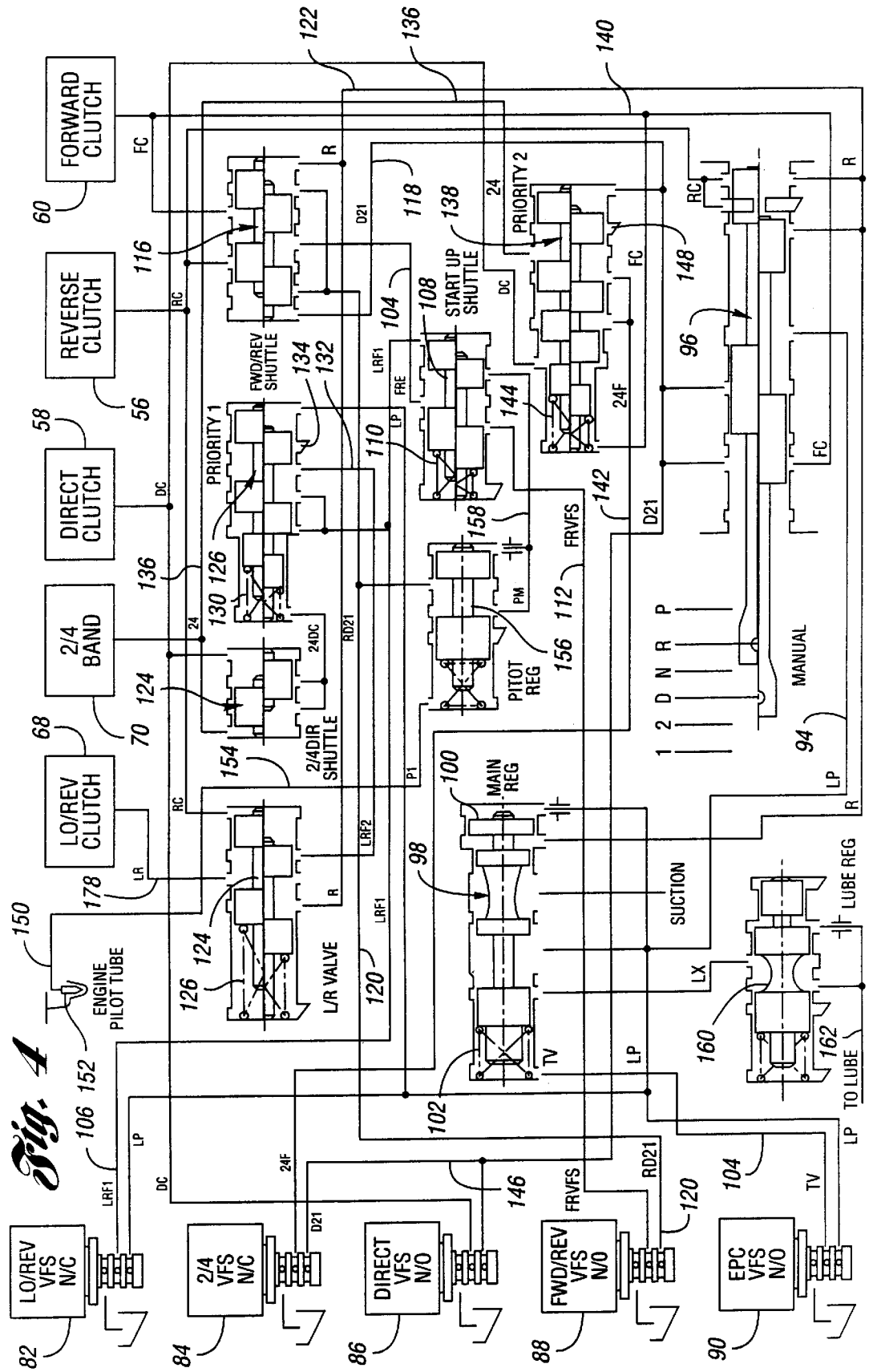

FIG. 4 shows a control valve system for obtaining the necessary torsional isolation and the necessary engine disconnect for the converterless transmission of the invention. The control valve circuit of FIG. 4 includes five variable force solenoid valves. These are the low-and-reverse variable force solenoid valve 82, the 2/4 variable force solenoid valve 84, the direct-drive variable force solenoid valve 86, the forward-and-reverse variable force solenoid valve 88, and the electronic pressure control variable force solenoid 90.

The transmission includes an engine-driven, positive-displacement transmission pump 92, which supplies line pressure through passage 94 to a driver-operated manual valve 96. The pressure in passage 94 is regulated by a main regulator valve 98 to produce a regulated line pressure in passage 94. A pressure feedback land 100 on the main regulator valve 98 opposes the force of regulator valve spring 102 to produce a controlled pressure in line pressure passage 94.

Electronic pressure control variable force solenoid valve 90 receives line pressure from passage 94 and modulates it to produce an effective throttle valve pressure, or TV pressure, in passage 104. This throttle valve pressure is distributed to one end of the main regulator valve to supplement the force of the spring 102, thereby providing a variable pressure in line pressure passage 94, which is variable depending on the torque demand.

During normal operation, the low-and-reverse variable force solenoid valve 82 is commanded by the vehicle transmission controller to produce a minimum pressure in passage 106, which is distributed to a startup shuttle valve 108. The shuttle valve 108 is a two-position valve, which is urged to the right by valve spring 110 and urged to the left by the pressure developed by the low-and-reverse variable force solenoid 82.

When the startup shuttle valve 108 is moved to the left, forward-and-reverse pressure in passage 112 is distribute through it to passage 114, which extends to the forward-and-reverse shuttle valve 116. When the forward-and-reverse shuttle valve is shifted to the right due to pressure in passage 118, low-and-reverse variable force solenoid valve pressure is distributed from passage 114 to the forward clutch 16.

The forward-and-reverse variable force solenoid valve 88 creates pressure for passage 112 as it modulates the pressure delivered to it from passage 120. This passage 120 is pressurized by reason of the connection provided by the forward-and-reverse shuttle valve 116 with the passage 118. Passage 118 is pressurized by the manual valve when the manual valve is positioned for drive range position D, the second ratio position 2 and the first ratio position 1.

If the manual valve is moved to the reverse position R, passage 118 becomes exhausted through the manual valve and reverse line pressure passage 122 becomes pressurized. This shifts the forward-and-reverse shuttle valve 116 to the left, thereby causing forward and reverse pressure in passage 114 to be distributed to the reverse clutch 56.

When the reverse clutch 56 is pressurized, the reverse clutch pressure shifts the low-and-reverse valve 124 to the left against the force of valve spring 126. This allows pressure in reverse line pressure passage 122 to be distributed through passage 128 to the low-and-reverse clutch 68.

The shuttle valve 124 and the priority 1 valve 126 prevent a transmission tie-up caused by simultaneous engagement of the direct clutch 58 and the low-and-reverse clutch 68. Thus, when the direct clutch 58 is applied, the shuttle valve 124 will shift to the left, thereby pressurizing the left side of priority 1 valve 126. At that time, pressure is distributed to the priority 1 valve 126 to supplement the force of spring 130. The low-and-reverse clutch then will be exhausted through line 128 and through passage 132 to the exhaust port 134 in the priority 1 valve 126.

A tie-up caused by simultaneous engagement of the forward clutch 60, the low-and-reverse clutch 68 and the 2/4 brake 70 is avoided by the 2/4 direct shuttle valve 124 and the priority 1 valve 126. Thus, if brake band 70 is applied, the shuttle valve 124 will shift to the right so that 2/4 brake pressure will be distributed from passage 136 through the shuttle valve 124 to the left side of the priority 1 valve. This causes the priority 1 valve to shift to the right and to exhaust the low-and-reverse clutch through the valve 124 and through the exhaust port 134 in the priority 1 valve 126.

A tie-up caused by the simultaneous engagement of the forward clutch 60, the direct clutch 58 and the 2/4 brake band 70 is avoided by the priority 2 valve 138, which generally is similar in construction to the priority 1 valve 126. When the forward clutch is applied, pressure in passage 140 and pressure in passage 142 act on the priority 2 valve 138 to establish pressure forces that act in combination with force of valve spring 144 to shift the priority 2 valve to the right. Pressure in passage 142 is obtained by the 2/4 variable force solenoid valve 84, which is supplied with line pressure through passage 146. Passage 136, which extends to the 2/4 brake band, then will be exhausted through exhaust port 148 in the priority 2 valve 138.

The control valve system of FIG. 4 includes an engine pitot tube pressure source generally identified by reference numeral 150. This includes a pitot tube element situated in a lube oil reservoir 152 driven by the engine. Relative motion of the fluid with respect to the pitot tube creates a pressure in passage 154, which is a function of the square of the engine speed. That pitot tube pressure acts on a pitot tube pressure regulator valve 156, which is supplied with line pressure from passage 120. Pressure in passage 120 is modulated by the valve 156 to produce a modulated pitot tube pressure in passage 158. This pressure is distributed to the passage 114 through the startup shuttle valve 108 when pressure is not available in passage 106 from the low-and-reverse variable force solenoid valve 82. At that time, shuttle valve 108 is shifted to the right under the influence of spring 110. This ensures that either the forward clutch 60 or the reverse clutch 58 will be pressurized through the forward and reverse shuttle valve 116. Thus, if there is an electrical failure that renders the variable force solenoid valves inoperable, a "limp home" capability is established.

When the manual valve is shifted to the neutral position N, neither of the forward-and-reverse variable force solenoid 88 nor the pitot regulator valve 156 is fed with supply pressure. This ensures that there will be no neutral creep of the vehicle.

A loss of electric power for the variable force solenoid valves will cause the system to default to third gear when the manual valve is in the drive position. It will default to reverse gear if the manual valve is in the reverse position.

A lubrication oil pressure regulator valve 160 acts in the usual fashion to establish a lubrication pressure in lube passage 162. It is supplied with pressure from the main regulator valve 98 in known fashion.

FIG. 6 shows in schematic form the neutral idle controller for the electronic damping. The controller maintains a small torque offset or delta torque as shown at 166. This is an offset from the average engine idle torque as the so-called set point torque (TQ_DES). The engagement control circuit of FIG. 6 establishes closed-loop modulation of the engaging clutch pressure 168 with actual engine torque feedback. Engine torque, which is obtained by a memory lookup table of the relationship between load and engine speed at 170, establishes a signal in signal flow path 172, which is equal to net torque (TQ_NET). After being filtered by a low-pass filter circuit 174, the net torque is fed back to a summing point 176 as filtered torque TQ_NETF. An error signal is established if there is a difference between the values TQ_DES and TQ_NETF at the output side 178 of the summing point 176.

The control for the clutch is achieved by a proportional-integral-differential controller 180. The output of the PID controller causes a change in the commanded pressure at location 182. This is the pressure T_TID. When this value of pressure is combined with the previous commanded pressure for the clutch in signal flow path 184, a net commanded pressure PRESX at signal flow path 168 is established. This pressure is distributed to the forward clutch in the case of forward drive or to the reverse clutch in the case of reverse drive to achieve a smooth vehicle launch.

The circuit of FIG. 5, which is a closed-loop circuit with actual engine speed as a feedback variable, becomes activated when the controller is signaled to launch the vehicle. The function of the circuit of FIG. 5 takes over the engine idle controller in FIG. 4 in a smooth fashion.

An engine map or lookup table at 186 receives the throttle position signal from signal flow path 188. A vehicle speed signal received from signal flow path 190, together with the speed signal that is inferred from the memory lookup table 186, establishes a target speed for the engine in signal flow path 192. That signal is filtered at 194 to produce a desired engine speed signal at 196. That desired engine speed signal is compared to an actual engine speed signal in signal flow path 198. If there is a difference between these two engine speed signals, an error is indicated in signal flow path 200. The signal in signal flow path 198 is the actual feedback variable.

A proportional-integral-derivative controller of conventional design receives the error signal, as shown at 202, resulting in a useful clutch pressure signal at 204 which is used to establish the desired clutch pressure.

Figure 7:
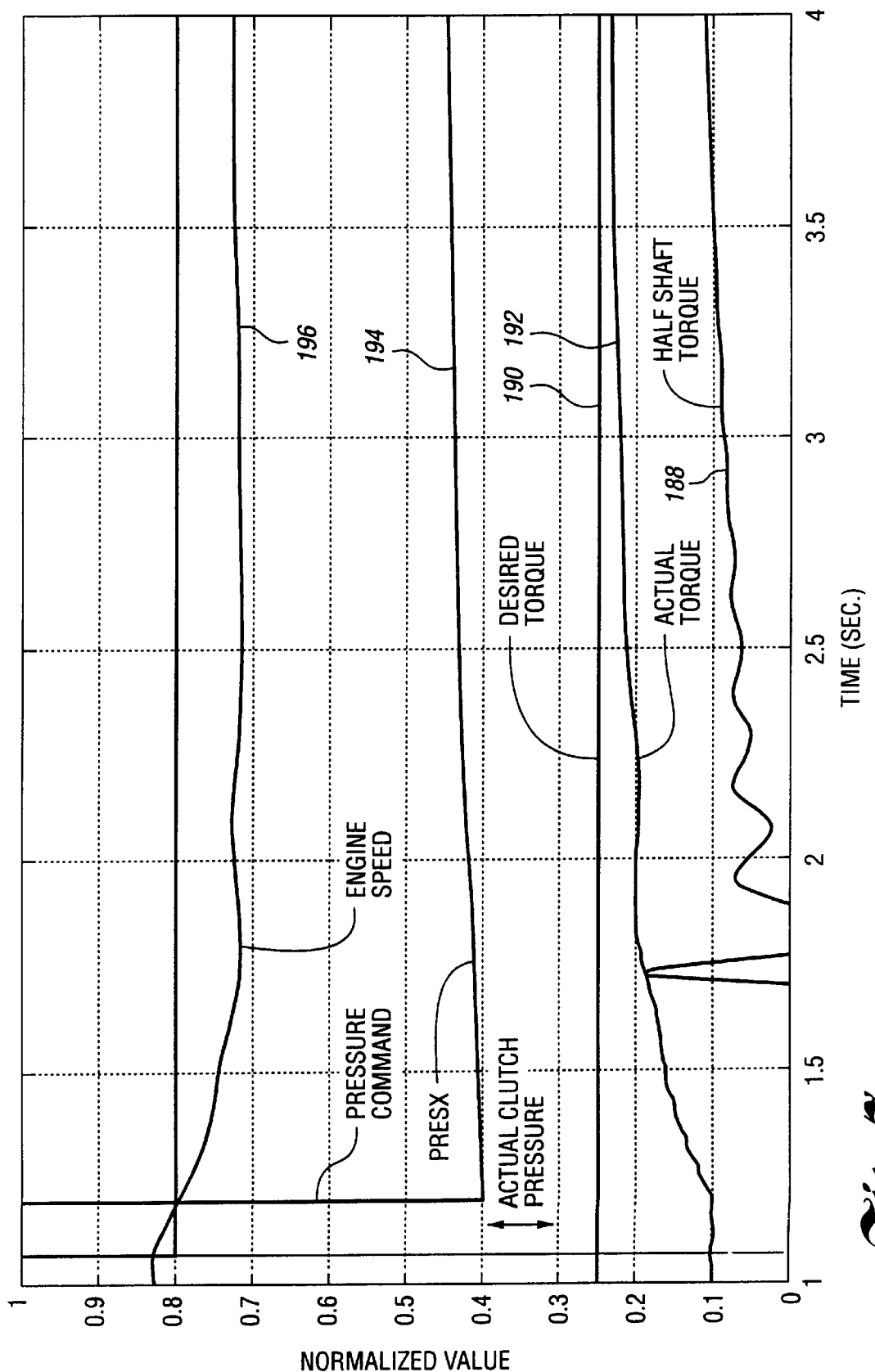

FIG. 7 is a plot that shows a comparison of the desired torque (TQ_DES) with the actual torque TQ_NETF during the initial four seconds following a vehicle launch. The corresponding half-shaft torque also is shown at 188. The desired torque is shown at 190, and the actual torque is shown at 192. The actual torque approaches the desired torque level as the clutch pressure gradually increases, as shown by the curve 194. The engine speed remains relatively constant during this period, as shown at 196.

FIG. 8 shows simulated data for a converterless transmission of the invention indicating the speed variations and the torque variations that occur following engagement of the clutch. The effective engine speed variations and the corresponding input torque variations, which are relatively minor, are shown respectively at 198 and 200. The effective output half shaft torque is shown at 202. There is only minimal output torque fluctuation indicated by the plot 202, which demonstrates that there is adequate torsional isolation provided by the control system of FIG. 5.

Although a preferred embodiment of the invention has been described, modifications to the invention may be made by persons skilled in the art without departing from the scope of the invention. All such modifications and equivalents thereof are covered by the following claims.

What is claimed is:

1. A converterless, multiple-ratio, automatic transmission for a vehicle driveline having an internal combustion engine, the transmission including a driven shaft in a torque flow path to vehicle traction vehicles;

planetary gearing of the transmission defining multiple forward drive torque flow paths between the engine and the driven shaft;

the engine having a crankshaft directly connected drivably to a torque input element of the gearing whereby the crankshaft and the torque input element are continuously coupled during torque delivery through the torque flow paths for rotation in unison;

pressure-operated friction clutch means in the transmission for establishing and disestablishing the torque flow paths including a forward drive clutch that is engaged for forward drive operation; and automatic clutch control means for disengaging and engaging the forward drive clutch to respectively disconnect and connect the engine from and to the gearing, thereby effecting control of the driveline during vehicle startup in forward drive.

2. A converterless, multiple-ratio, automatic transmission for a vehicle driveline having an internal combustion engine, the transmission including a driven shaft in a torque flow path to vehicle traction wheels;

planetary gearing of the transmission defining a reverse drive torque flow path between the engine and the driven shaft;

the engine having a crankshaft directly connected drivably to a torque input element of the gearing whereby the crankshaft and the torque input element are continuously coupled during torque delivery through the reverse drive torque flow path for rotation in unison;

pressure-operated friction clutch means in the transmission for establishing and disestablishing a reverse drive torque flow path including a reverse drive clutch that is engaged for reverse drive operation; and automatic clutch control means for disengaging and engaging the reverse drive clutch to respectively disconnect and connect the engine from and to the gearing, thereby effecting control of the driveline during vehicle startup in reverse drive.

3. The automatic transmission set forth in claim 1 wherein the clutch control means comprises a line pressure pump connected to the torque input element of the gearing;

a control valve circuit means including an electronic processor and a manually operable range selector valve for distributing pressure generated by the line pressure pump to the forward drive clutch in a closed-loop fashion with actual engine torque as a feedback variable whereby forward clutch pressure effects a controlled and smooth engagement during vehicle startup;

the processor including means for continuously detecting actual engine torque during a vehicle launch in forward drive and comparing it to a target engine torque determined by a vehicle operator to detect an error and establishing a forward drive clutch pressure that is functionally related to the magnitude of the error.

4. The automatic transmission set forth in claim 2 wherein the clutch control means comprises a line pressure pump connected to the torque input element of the gearing;

a control valve circuit means including an electronic processor and a manually operable range selector valve for distributing pressure generated by the line pressure pump to the reverse drive clutch in a closed-loop fashion with actual engine torque as a feedback variable whereby reverse clutch pressure effects a controlled and smooth engagement during vehicle startup;

the processor including means for continuously detecting actual engine torque during a vehicle launch in reverse drive and comparing it to a target engine torque determined by a vehicle operator to detect an engine torque error and establishing a reverse drive clutch pressure that is functionally related to the magnitude of the torque error.

5. A converterless transmission as set forth in claim 2 wherein the clutch control means comprises a line pressure pump connected to the torque input element of the gearing;

a control valve circuit means including an electronic processor and a manually operable range selector valve for distributing pressure generated by the line pressure pump to the forward drive clutch in a closed-loop fashion with actual engine speed as a feedback variable to establish modulated pressure engagement of the forward drive clutch thereby effecting torsional vibration isolation during operation of the vehicle following launch;

the processor including means for continuously detecting actual engine speed and comparing to a speed commanded by a vehicle operator to detect an engine speed error and establishing a controlled pressure in a pressure-operated clutch means in the transmission that is functionally related to the speed error.

6. The converterless transmission set forth in claim 3 wherein the control valve circuit includes solenoid-operated valve means communicating with the line pressure pump for establishing a controlled pressure for distribution to the clutch means in the transmission; and an auxiliary pressure source including a pitot tube pressure element and a rotary fluid reservoir driven by the engine containing fluid that is engaged by the pitot tube pressure element; and means for establishing controlled communication between the auxiliary pressure source and the clutch means in the transmission when the solenoid-operated valve means is disabled.

7. The converterless transmission set forth in claim 4 wherein the control valve circuit includes solenoid-operated valve means communicating with the line pressure pump for establishing a controlled pressure for distribution to the clutch means in the transmission; and an auxiliary pressure source including a pitot tube pressure element and a rotary fluid reservoir driven by the engine containing fluid that is engaged by the pitot tube pressure element; and means for establishing controlled communication between the auxiliary pressure source and the clutch means in the transmission when the solenoid-operated valve means is disabled.

* * * * *